United States Patent
Hsu et al.

(10) Patent No.: US 9,573,815 B2
(45) Date of Patent: Feb. 21, 2017

(54) THIOLATION METHOD FOR MODIFYING NANODIAMONDS

(71) Applicant: NATIONAL TSING HUA UNIVERSITY, Hsinchu (TW)

(72) Inventors: Ming-Hua Hsu, Hsinchu (TW); Hong Chuang, Kinmen County (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 14/535,293

(22) Filed: Nov. 6, 2014

(65) Prior Publication Data

US 2016/0075561 A1 Mar. 17, 2016

(30) Foreign Application Priority Data

Sep. 12, 2014 (TW) .............................. 103131592 A

(51) Int. Cl.
  *C01B 31/06* (2006.01)
  *B82Y 40/00* (2011.01)

(52) U.S. Cl.
  CPC .............. *C01B 31/065* (2013.01); *B82Y 40/00* (2013.01); *Y10S 977/734* (2013.01); *Y10S 977/847* (2013.01)

(58) Field of Classification Search
  None
  See application file for complete search history.

(56) References Cited

U.S. PATENT DOCUMENTS

2003/0199710 A1* 10/2003 Liu .................... B82Y 10/00
                                                          562/498

2010/0028675 A1* 2/2010 Gogotsi .................. B82Y 30/00
                                                          428/402

OTHER PUBLICATIONS

Schreiner et al.;Functionalized Nanodiamonds Part 3: Thiolation of Tertiary/Bridgehead Alcohols; Organic Letters; vol. 8, No. 9; 1767-1770; 2006.*
Shenderova and Hens; Nanodiamonds: Applications in Biology and Nanoscale Medicine; 2010.*
Ming-Hua Hsu et al., "Directly Thiolated Modification onto the Surface of Detonation Nanodiamonds", ACS Applied Materials and Interfaces, 2014, 6 (10), Apr. 25, 2014, pp. 7198-7203.

* cited by examiner

*Primary Examiner* — Guinever S Gregorio
(74) *Attorney, Agent, or Firm* — CKC & Partners Co., Ltd.

(57) ABSTRACT

A thiolation method for modifying nanodiamonds includes steps as follows. A carboxylation step is provided, wherein the nanodiamonds are reacted with an oxidant for generating carboxyl groups on surfaces of the nanodiamonds so as to form carboxylated nanodiamonds. A hydroxylation step is provided, wherein the carboxyl groups of the carboxylated nanodiamonds are transformed into hydroxyl groups so as to transform the carboxylated nanodiamonds into hydroxylated nanodiamonds. A thiolation step is provided. In the thiolation step, the hydroxylated nanodiamonds, a sulfur source and a first acidic substance are mixed and then stirred so as to form a first mixture, the first mixture is added portionwisely into an alkaline solution so as to form a second mixture, and the second mixture is acidified so as to form an acidified solution having a pH value ranging from 2 to 3, thus the hydroxylated nanodiamonds are transformed into thiolated nanodiamonds.

21 Claims, 7 Drawing Sheets

US 9,573,815 B2

THIOLATION METHOD FOR MODIFYING NANODIAMONDS

RELATED APPLICATIONS

This application claims priority to Taiwan Application Serial Number 103131592, filed Sep. 12, 2014, which is herein incorporated by reference.

BACKGROUND

Technical Field

The present disclosure relates to a method for modifying nanodiamonds. More particularly, the present disclosure relates to a thiolation method for modifying nanodiamonds.

Description of Related Art

Nanotechnology has been widely applied to many fields, such as surface science, material, semiconductor or drug delivery. The application of nanoscale materials or devices in diagnosis or treatment of diseases is termed nanomedicine. Among developed nanoscale materials, nanodiamonds (ND) exhibit excellent physical and chemical properties, biocompatibility and low toxicity, and are thus regarded as a promising candidate material for nanomedicine and has received considerable attention.

The nanodiamonds can be synthesized by a detonation method. Specifically, a mixture of trinitrotoluene (TNT) and hexogen is exploded in a closed metallic chamber, and a carbon-containing material, such as graphite or carbon nanotube, is transformed into the nanodiamonds by a shock wave.

It is proved that the nanodiamonds be applied to drug delivery applications, can be conjugated with amino acids or DNA as biomarkers or tracers according to specific purposes, and also can be conjugated with fluorescein and magnetic resonance aging (MRI) contrast agents for enhancing image quality.

To achieve the above applications, surfaces of the nanodiamonds are usually modified for generating hydrophilic functional groups thereon. For an example, the surfaces of the nanodiamonds can be oxidized by an acid or ozone ($O_3$) for generating carboxyl groups (COOH) on the surfaces of the nanodiamonds. The carboxyl groups can be further transformed into carboxyl chloride groups (COCl) or hydroxyl groups (OH).

Thiol groups (SH) can be found in proteins and antibodies. A number of the thiol groups in the proteins and the antibodies is lower than that of carboxyl groups or amino groups. Therefore, by using the thiol groups to conjugate with target molecules, numbers and positions of modification sites can be controlled. Moreover, the thiol groups exhibit a strong affinity for gold and thus can be applied to conjugate with gold nanoparticles. Gold nanoparticles have been successfully applied to biological detections, specimen analyses and developers of computed tomography (CT) scan. If the nanodiamonds can be modified with thiol groups, the applications of the nanodiamonds in nanomedicine can be broadened.

The surfaces of the nanodiamonds can be modified with thiol groups by methods as follows. In a first method, the thiol groups can be conjugated on the surfaces of the nanodiamonds via space linkers. In a second method, elemental sulfur and carbon disulfide are provided for modifying the nanodiamonds via a photochemical reaction. However, in the first method, the thiol groups are not directly conjugated on the surfaces of the nanodiamonds. As a result, physical properties of the nanodiamonds may be affected by the space linkers, and a conductivity or applications thereof may be affected. In the second method, a specific equipment is required for the photochemical reaction. The specific equipment is expensive. Accordingly, it is unfavorable to apply the second method to mass production and the production cost thereof remains high.

Therefore, how to directly modify the surfaces of the nanodiamonds with thiol groups, which is favorable to apply to mass production and has low production cost, has become an important goal of relevant academia and industry.

SUMMARY

According to one aspect of the present disclosure, a thiolation method for modifying nanodiamonds includes steps as follows. A carboxylation step is provided, wherein the nanodiamonds are reacted with an oxidant for generating carboxyl groups on surfaces of the nanodiamonds so as to form carboxylated nanodiamonds. A hydroxylation step is provided, wherein the carboxyl groups of the carboxylated nanodiamonds are transformed into hydroxyl groups so as to transform the carboxylated nanodiamonds into hydroxylated nanodiamonds. A thiolation step is provided. The thiolation step includes steps as follows. The hydroxylated nanodiamonds, a sulfur source and a first acidic substance are mixed and then stirred at a temperature ranging from 125° C. to 160° C. for 36 hours to 60 hours so as to form a first mixture. The first mixture is added portion-wisely into an alkaline solution at a temperature ranging from 0° C. to 35° C. for 12 hours to 36 hours so as to form a second mixture. The second mixture is acidified so as to form an acidified solution having a pH value ranging from 2 to 3. Thus the hydroxylated nanodiamonds are transformed into thiolated nanodiamonds.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
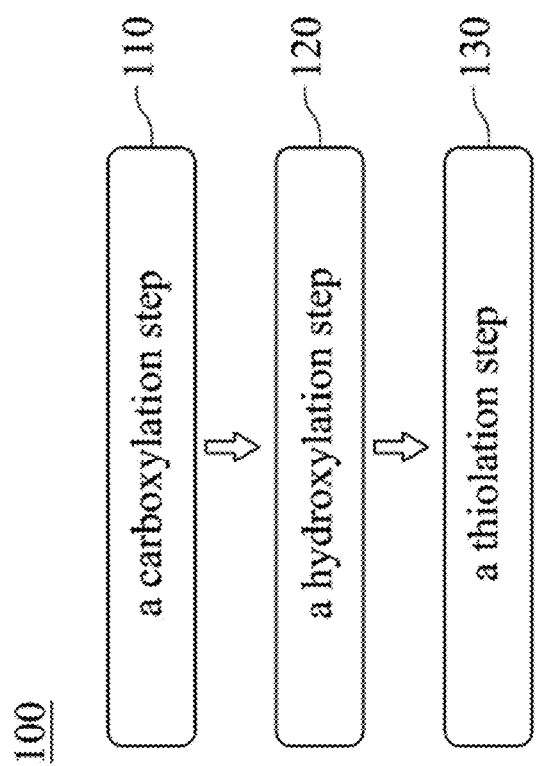
FIG. 1 is a flow diagram showing a thiolation method for modifying nanodiamonds according to one embodiment of the present disclosure.

FIG. 1 is a flow diagram showing a thiolation method 100 for modifying nanodiamonds according to one embodiment of the present disclosure. In FIG. 1, the thiolation method 100 for modifying the nanodiamonds includes a carboxylation step 110, a hydroxylation step 120 and a thiolation step 130.

First, the carboxylation step 110 is provided, wherein the nanodiamonds are reacted with an oxidant for generating carboxyl groups on surfaces of the nanodiamonds so as to form carboxylated nanodiamonds. The nanodiamonds can be synthesized by a detonation method, so that the production cost thereof can be reduced, and it is favorable to mass production. An average particle size of the nanodiamonds can range from 5 nm to 100 nm. Therefore, it is favorable to applied to nanotechnologies such as nanomedicine. The oxidant can be an acid, ozone, potassium permanganate ($KMnO_4$), potassium dichromate ($K_2Cr_2O_7$) or a mixture of sulfuric acid ($H_2SO_4$) and hydrogen peroxide ($H_2O_2$). In the mixture of the $H_2SO_4$ and the $H_2O_2$, a volume ratio of the $H_2SO_4$ to the $H_2O_2$ ranges from 3:1 to 4:1. When the oxidant is the acid, the acid can be $H_2SO_4$, nitric acid ($HNO_3$), perchloric acid ($HClO_4$), hydrochloric acid (HCl) or a mixture thereof. Furthermore, the carboxylation step 110 can be conducted at a temperature ranging from 85° C. to 130° C. for 60 hours to 84 hours.

Second, the hydroxylation step 120 is provided, wherein the carboxyl groups of the carboxylated nanodiamonds are transformed into hydroxyl groups so as to transform the carboxylated nanodiamonds into hydroxylated nanodiamonds.

Figure 2:
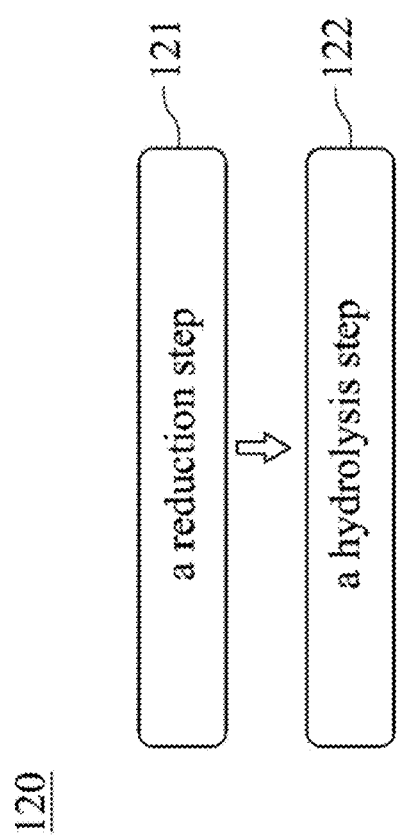
FIG. 2 is a flow diagram showing a hydroxylation step of the thiolation method for modifying the nanodiamonds in FIG. 1.

FIG. 2 is a flow diagram showing the hydroxylation step 120 of the thiolation method 100 for modifying the nanodiamonds in FIG. 1. In FIG. 2, the hydroxylation step 120 includes a reduction step 121 and a hydrolysis step 122.

The reduction step 121 is provided, wherein the carboxylated nanodiamonds, a reductant and a first solvent are mixed, and the carboxyl groups of the carboxylated nanodiamonds are reduced so as to form a reaction solution. The reductant can be lithium aluminium hydride ($LiAlH_4$), borane ($BH_3$), or a Fenton reagent. The Fenton reagent can be an acidic mixture of ferrous sulfate and hydrogen peroxide. According to one example of the present disclosure, the ratio of the ferrous sulfate to the hydrogen peroxide (30 vol %) of the Fenton reagent is 1 gram to 1 milliliter, and a pH value of the Fenton reagent is adjusted to less than 3 with concentrated sulfuric acid. The first solvent can be anhydrous tetrahydrofuran or anhydrous ether. Furthermore, the reduction step 121 can be conducted at a temperature ranging from 40° C. to 80° C. for 20 hours to 30 hours.

The hydrolysis step 122 is provided, wherein a second acidic substance is added into the reaction solution so as to obtain the hydroxylated nanodiamonds. The second acidic substance can be hydrochloric acid, sulfuric acid, hydrobromic acid (HBr), hydroiodic acid (HI) or acetic acid ($CH_3COOH$).

According to another embodiment of the present disclosure, the hydroxyl groups can be generated by attrition milling or beads assisted sonic disintegration (BASS) in the hydroxylation step 120.

Referring back to FIG. 1, the thiolation step 100 is provided. The thiolation step 130 includes steps as follows. First, the hydroxylated nanodiamonds, a sulfur source and a first acidic substance are mixed and then stirred at a temperature ranging from 125° C. to 160° C. for 36 hours to 60 hours so as to form a first mixture. The sulfur source can be thiourea ($CH_4N_2S$) or thioacetic acid ($C_2H_4OS$). The first acidic substance can be hydrobromic acid, acetic acid, hydroiodic acid, chloric acid ($HClO_3$), perchloric acid, phosphoric acid ($H_3PO_4$) or a mixture thereof. A pH value of the first acidic substance can range from 0 to 2. Second, the first mixture is added portion-wisely into an alkaline solution at a temperature ranging from 0° C. to 35° C. for 12 hours to 36 hours so as to form a second mixture. A pH value of the alkaline solution can range from 10 to 14. The alkaline solution can be a sodium hydroxide (NaOH) solution or a potassium hydroxide (KOH) solution. A temperature of the alkaline solution can range from 0° C. to 30° C. A concentration of the alkaline solution can range from 5 weight percentage (wt %) to 30 wt %. Third, the second mixture is acidified so as to form an acidified solution having a pH value ranging from 2 to 3. By the thiolation step 130, the hydroxylated nanodiamonds are transformed into thiolated nanodiamonds. The second mixture can be acidified by adding sulfuric acid, hydrochloric acid, hydrobromic acid, hydroiodic acid or acetic acid into the second mixture. A concentration of the sulfuric acid, the hydrochloric acid, the hydrobromic acid, the hydroiodic acid or the acetic acid can range from 35 wt % to 75 wt %. The second mixture can be acidified at a temperature ranging from 0° C. to 15° C.

Figure 3:
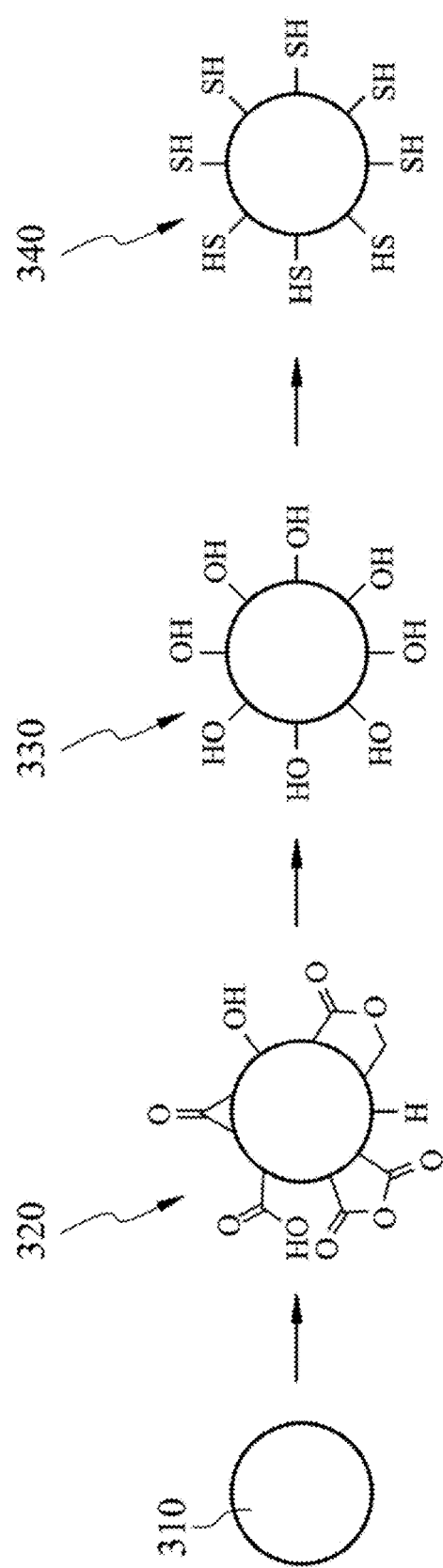
FIG. 3 is a schematic view showing a reaction of a thiolation method for modifying nanodiamonds according to another embodiment of the present disclosure.

FIG. 3 is a schematic view showing a reaction of a thiolation method for modifying nanodiamonds according to another embodiment of the present disclosure. For simplifying, only one nanodiamonds 310 is illustrated in FIG. 3. In FIG. 3, the nanodiamonds 310 is transformed into a carboxylated nanodiamonds 320 by a carboxylation step. In the example, at least one carboxyl group and other oxygen-containing groups (such as carbonyl group) are generated on a surface of the carboxylated nanodiamonds 320. After a hydroxylation step, the carboxyl group and the other oxygen-containing groups are transformed into hydroxyl groups, so that the carboxylated nanodiamonds 320 is transformed into a hydroxylated nanodiamonds 330. After a thiolation step, the hydroxyl groups are transformed into thiol groups, so that the hydroxylated nanodiamonds 330 is transformed into a thiolated nanodiamonds 340. In FIG. 3, a number of the functional groups (the carboxyl group, the oxygen-containing groups, the hydroxyl groups and the thiol groups) on the surface of the carboxylated nanodiamonds 320, the hydroxylated nanodiamonds 330 and the thiolated nanodiamonds 340 is only for example, and the number of the functional groups is not limited as that shown in FIG. 3.

Figure 4:
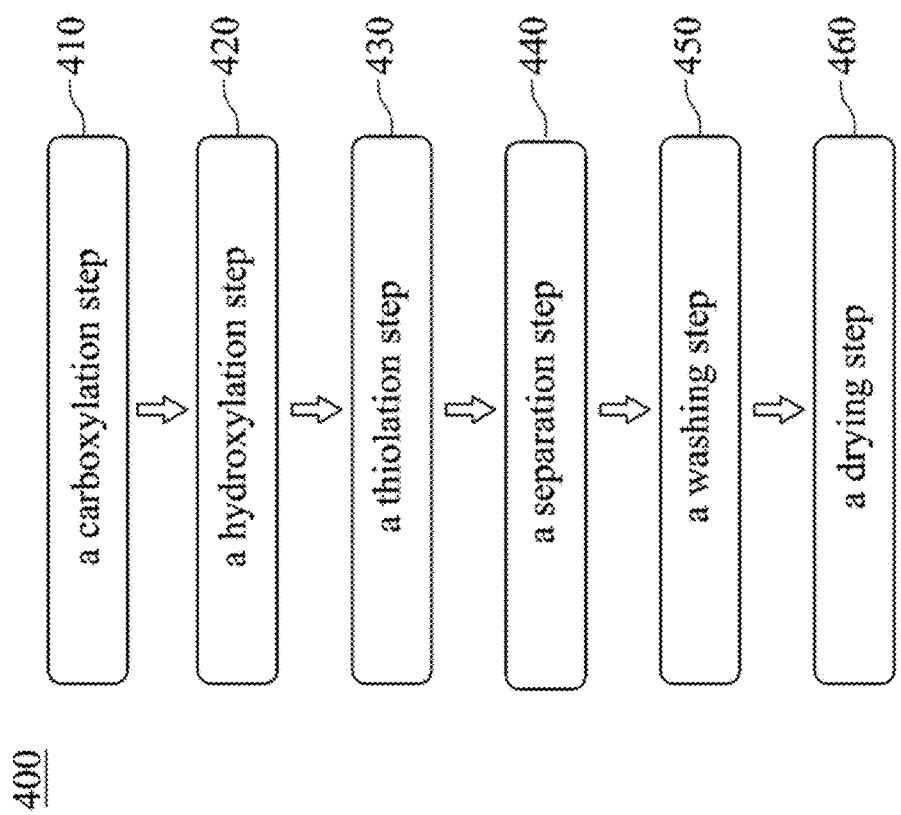
FIG. 4 is a flow diagram showing a thiolation method for modifying nanodiamonds according to yet another embodiment of the present disclosure.

FIG. 4 is a flow diagram showing a thiolation method 400 for modifying nanodiamonds according to yet another embodiment of the present disclosure. In FIG. 4, the thiolation method 400 for modifying the nanodiamonds includes a carboxylation step 410, a hydroxylation step 420, a thiolation step 430, a separation step 440, a washing step 450 and a drying step 460.

The carboxylation step 410 is provided. The hydroxylation step 420 is provided. The thiolation step 430 is provided. The details of the carboxylation step 410, the hydroxylation step 420 and the thiolation step 430 are the same as that of the carboxylation step 110, the hydroxylation step 120, and the thiolation step 130 in FIG. 1, and will not be repeated herein.

The separation step 440 is provided, wherein thiolated nanodiamonds are separated from an acidified solution. The washing step 450 is provided, wherein the thiolated nanodiamonds are washed with water. The water can be distilled water or deionized water. The drying step 460 is provided, wherein the thiolated nanodiamonds washed with the water are heated to dryness. The drying step 460 can be conducted at a temperature ranging from 40° C. to 80° C. for 16 hours to 32 hours.

EXAMPLES

Preparation of Thiolated Nanodiamonds

Nanodiamonds having an average particle size of 5 nm and nanodiamonds having an average particle size of 100 nm are respectively synthesized by a detonation method. For concision, nanodiamonds having an average particle size of 5 nm are written as 5 nm nanodiamonds, carboxylated nanodiamonds having an average particle size of 5 nm are written as 5 nm carboxylated nanodiamonds, and so on.

A carboxylation step is provided. Specifically, the 5 nm nanodiamonds (500 mg) and an oxidant (80 mg) are mixed so as to form a suspension solution. In the example, the oxidant is a mixture of $H_2SO_4$ and $HNO_3$. The volume ratio of the $H_2SO_4$ to the $HNO_3$ is 3:1 ($H_2SO_4$ and $HNO_3$: 20 mL). The suspension solution is stirred at 100° C. for 72 hours. Then the suspension solution is poured into distilled water (500 mL). Pellets are collected by centrifugation at 8,000 rpm and are washed with distilled water several times. Then the pellets are dried in a vacuum oven at 50° C. for 24 hours. By the carboxylation step, 5 nm carboxylated nanodiamonds are obtained.

A hydroxylation step is provided. Specifically, the 5 nm carboxylated nanodiamonds (300 mg), $LiAlH_4$ (113.9 mg, 3.000 mm le) and anhydrous tetrahydrofuran (15 mL) are mixed and stirred under reflux at a temperature ranging from 4° C. to 80° C. for 24 hours so as to form a reaction solution. After cooling to room temperature, the reaction solution is hydrolyzed by adding 1.0 N HCl into the reaction solution until no further evolution of hydrogen gas is observed. Pellets are collected by centrifugation at 8,000 rpm and are washed with distilled water and acetone several times. Then the pellets are dried in a vacuum oven at 50° C. for 24 hours. By the hydroxylation step, 5 nm hydroxylated nanodiamonds are obtained.

A thiolation step is provided. Specifically, the 5 nm hydroxylated nanodiamonds (200 mg), thiourea (11.4 g, 150 mmol) and a first acidic substance are mixed and stirred under reflux at a temperature ranging from 125° C. to 160° C. for 48 hours so as to form a first mixture. In the example, the first acidic substance is a mixture of HBr (25 mL) and glacial acetic acid (50 mL). The first mixture is added portion-wisely into a 0° C. and 15 wt % aqueous NaOH solution (600 mL) and stirred overnight at room temperature so as to form a second mixture. The second mixture is acidified by adding 50 wt % aqueous $H_2SO_4$ so as to form an acidified solution having a pH value ranging from 2 to 3. During acidifying, a temperature of the second mixture is maintained at 0° C. to 10° C. Afterward, pellets are collected by centrifugation at 8,000 rpm and are washed with distilled water several times. Then the pellets are dried in a vacuum oven at 50° C. for 24 hours. By the thiolation step, 5 nm thiolated nanodiamonds are obtained. The reaction mechanism of the thiolation step is as follows.

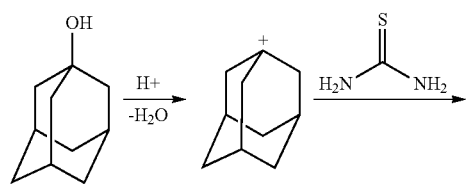

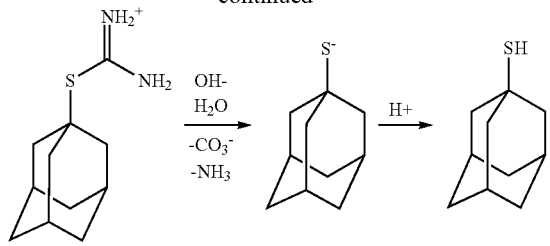

Repeat the carboxylation step, the hydroxylation step and the thiolation step, but replace the 5 nm nanodiamonds with the 100 nm nanodiamonds. The other reaction conditions and steps are maintained, and 100 nm thiolated nanodiamonds can be obtained.

Figure 5:
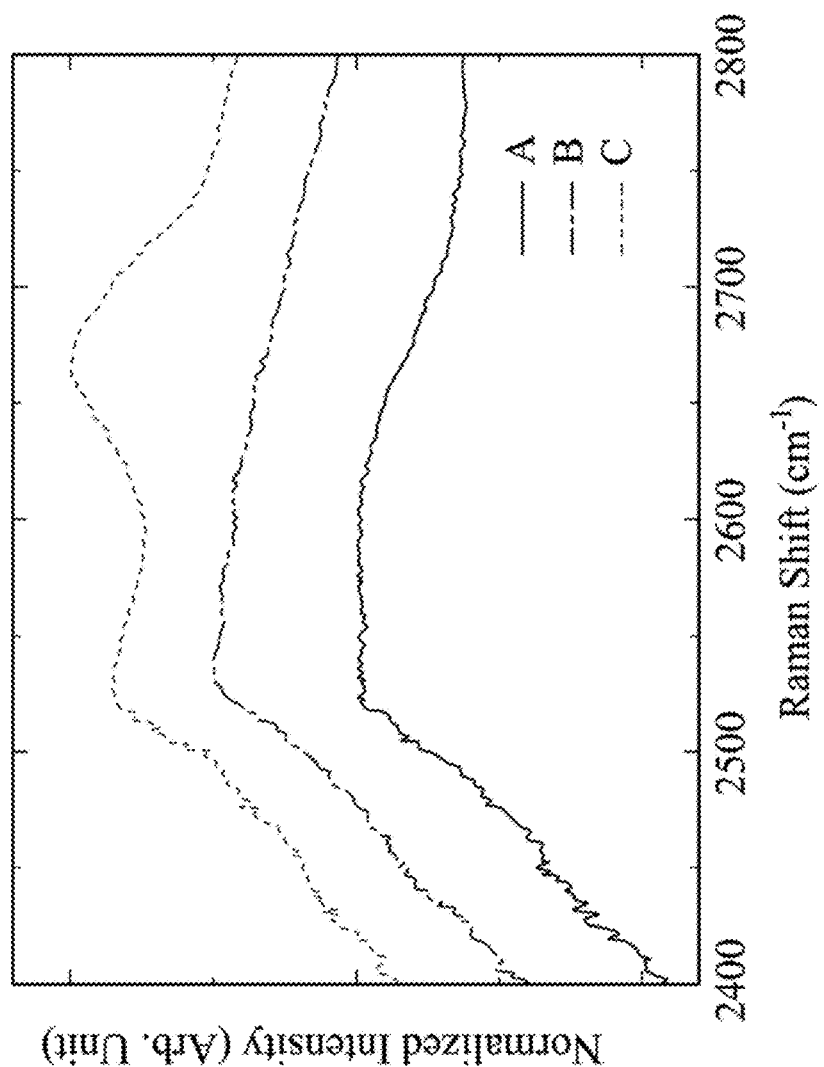
FIG. 5 shows Raman spectra of nanodiamonds, carboxylated nanodiamonds and thiolated nanodiamonds according to one example of the present disclosure.

FIG. 5 shows Raman spectra of nanodiamonds, carboxylated nanodiamonds and thiolated nanodiamonds according to one example of the present disclosure. In FIG. 5, the nanodiamonds, the carboxylated nanodiamonds and the thiolated nanodiamonds have an average particle size of 5 nm, wherein the Raman spectrum of the nanodiamonds without surface modification is represented by A, the Raman spectrum of the carboxylated nanodiamonds is represented by B, and the Raman spectrum of the thiolated nanodiamonds is represented by C. The characteristic thiol group signal at 2670 $cm^{-1}$ can be observed from C, which proofs that the thiolation method for modifying the nanodiamonds according to the present disclosure can successfully modify the surfaces of the nanodiamonds with thiol groups.

Mixture of Gold Nan Particles and Thiolated Nanodiamonds

First, gold nanoparticles having an average particle size of 13 nm are provided. The gold nanoparticles are obtained by a citrate reduction of $HAuCl_4$. Specifically, an aqueous solution of $HAuCl_4$ (1 mM, 20 mL) is stirred under reflux at 110° C. in an oil bath. An aqueous solution of trisodium citrate (38.8 mM, 2 mL) is added quickly into the aqueous solution of $HAuCl_4$, which results in a series of color changes before finally achieving a wine red solution. The wine red solution is stirred under reflux for about 10 minutes and is cooled to room temperature.

Figure 6:
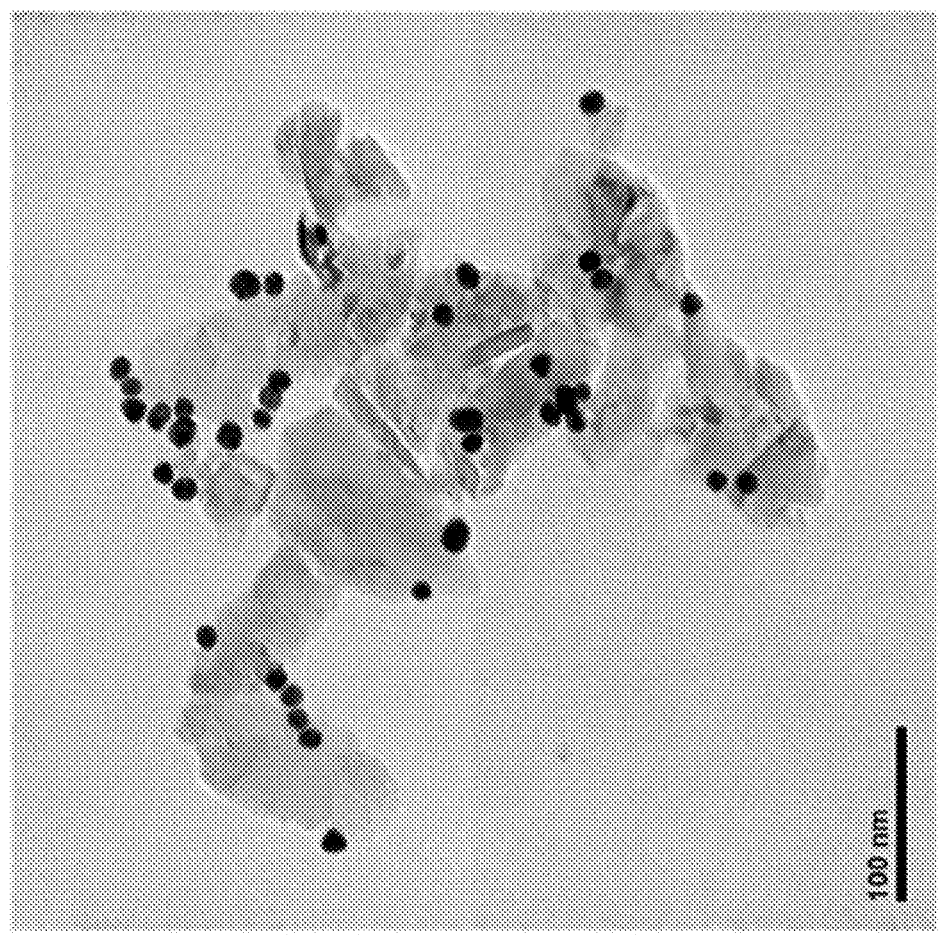
FIG. 6 is a high-resolution transmission electron microscopy (HRTEM) image of a mixture of gold nanoparticles and thiolated nanodiamonds according to another example of the present disclosure.

The gold nanoparticles are mixed with the thiolated nanodiamonds so as to form a mixture. The mixture then is observed with a high-resolution transmission electron microscopy (JEOL JEM-2100F). FIG. 6 is a HRTEM image of the mixture of the gold nanoparticles and the thiolated nanodiamonds according to another example of the present disclosure. In FIG. 6, the thiolated nanodiamonds are conjugated with the gold nanoparticles, which also proofs that the thiolation method for modifying the nanodiamonds according to the present disclosure can successfully modify the surfaces of the nanodiamonds with thiol groups, so that the thiolated nanodiamonds can conjugate with the gold nanoparticles via thiol groups.

Cell Toxicity Analysis of Thiolated Nanodiamonds

A-549 cells, a human lung carcinoma cell line, are used as test cells. The human lung carcinoma cell line (BCRC number: 60074) is purchased from Bioresource Collection and Research Center (BCRC, Taiwan), which is isolated from a lung carcinoma of a 58-year male. The A-549 Cells are cultured in 90% Ham's F12k medium with 2 mM L-glutamine adjusted to contain 1.5 µg/L sodium bicarbonate and 10% fetal bovine serum (FBS) at 37° C. in humidified atmosphere with 5% $CO_2$.

In a biological safety cabinet, the 5 nm thiolated nanodiamonds and the 100 nm thiolated nanodiamonds are mixed with sterilized distilled water so as to form a 0.1 µg/mL suspension solution, a 1.0 µg/mL suspension solution, a 10 µg/mL suspension solution, and a 50 µg/mL suspension solution, respectively. The A-549 Cells are seeded into wells of a 96-well plate at a concentration of 5000 cells per well. After 20 hours, the 0.1 µg/mL, 1.0 µg/mL, 10 µg/mL and 50 µg/mL suspension solution of the 5 nm thiolated nanodiamonds and the 0.1 µg/mL, 1.0 µg/mL, 10 µg/mL and 50 µg/mL suspension solution of the 10 nm thiolated nanodiamonds are respectively added into the wells of the 96-well plate. After 24 hours in complete medium, the medium is replaced by 0.5 mg/mL of 3-(4,5-dimethylthiazol-2-yl)-2,5-diphenyltetrazolium bromide (MTT) in complete medium at 37° C. for 3 hours. The A-549 cells that survive transform the MTT into insoluble formazan with blue-purple color, and then dimethyl sulfoxide is added into the wells of the 96-well plate to dissolve formazan for 20 min. The absorbance is measured at 570 nm using a microplate ELISA reader (VersaMax, Molecular Devices). A cell viability is calculated by the following formula: the cell viability (100%)=[(absorbance of the A-549 cells treated with thiolated nanodiamonds)/(absorbance of the untreated A-549 cells)]×100%.

Figure 7:
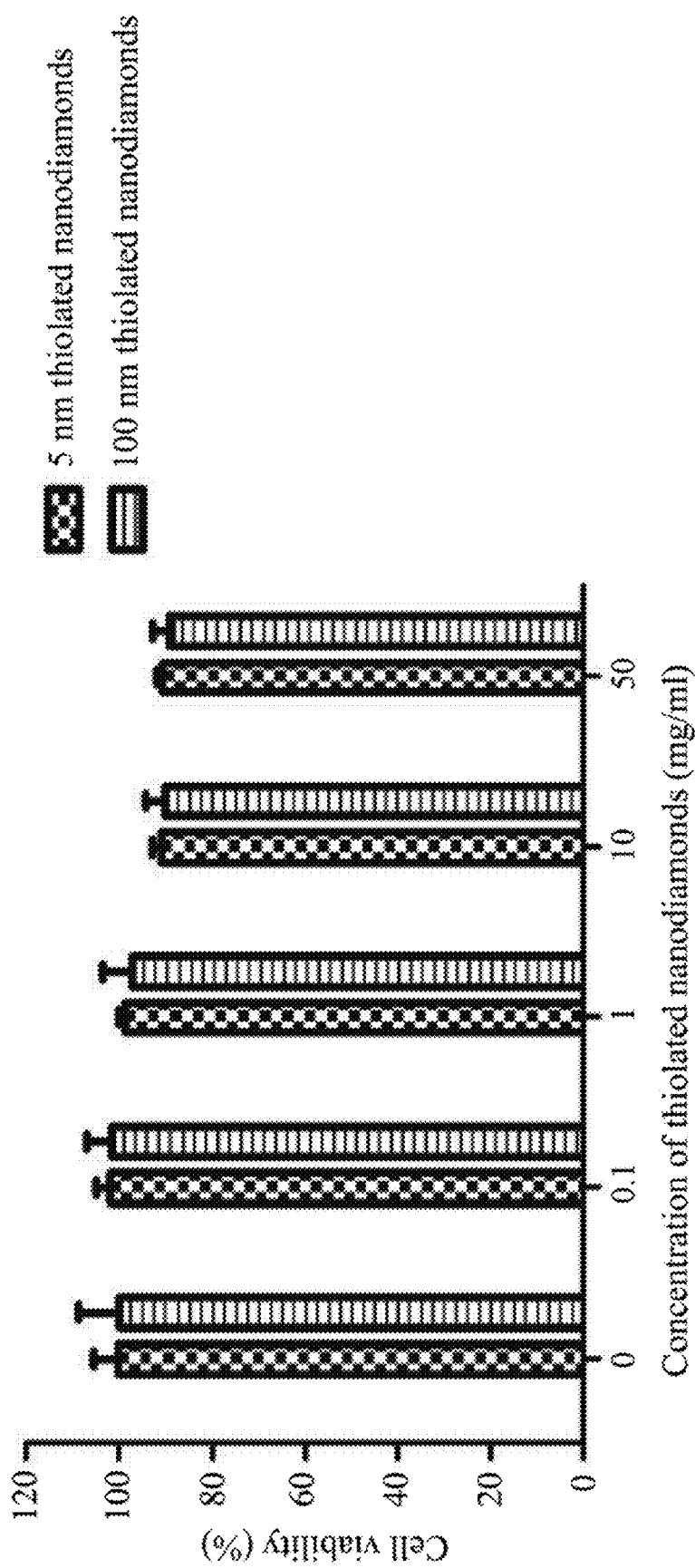
FIG. 7 shows a relationship between cell viability and concentration of thiolated nanodiamonds according to further another example of the present disclosure.

FIG. 7 shows a relationship between cell viability and concentration of thiolated nanodiamonds according to further another example of the present disclosure. In FIG. 7, the cell viabilities of the A-549 cells treated with thiolated nanodiamonds are all higher than 90%, which proofs that the thiolated nanodiamonds manufactured by the thiolation method for modifying the nanodiamonds according to the present disclosure have low toxicity. Therefore, the thiolated nanodiamonds manufactured by the thiolation method for modifying the nanodiamonds can be applied to nanomedicine.

To sum up, the thiolation method for modifying the nanodiamonds according to the present disclosure has advantages as follows. First, the nanodiamonds can be synthesized by the detonation method, so that the production cost thereof can be reduced, and it is favorable to mass production. Second, the thiol groups can be directly conjugated on the surfaces of the nanodiamonds, and the physical properties of the nanodiamonds can be maintained without the space linkers. Third, a specific and expensive equipment for photochemical reaction is not required, thus the thiolation method has a low equipment cost and can be carried out in an ordinary laboratory. Fourth, the thiolated nanodiamonds manufactured by the thiolation method has low toxicity and can be conjugated with gold nanoparticles, and accordingly has high potential in nanomedicine.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A thiolation method for modifying nanodiamonds comprising:
    providing nanodiamonds synthesized by a detonation method;
    providing a carboxylation step, wherein the nanodiamonds are reacted with an oxidant for generating carboxyl groups on surfaces of the nanodiamonds so as to form carboxylated nanodiamonds;
    providing a hydroxylation step, wherein a reductant is added for transforming the carboxyl groups of the carboxylated nanodiamonds into hydroxyl groups so as to transform the carboxylated nanodiamonds into hydroxylated nanodiamonds, and the reductant is lithium aluminium hydride ($LiAlH_4$), borane ($BH_3$), or a Fenton reagent; and
    providing a thiolation step, comprising:
        mixing the hydroxylated nanodiamonds, a sulfur source and a first acidic substance and then stirring at a temperature ranging from 125° C. to 160° C. for 36 hours to 60 hours so as to form a first mixture;
        adding the first mixture portion-wisely into an alkaline solution at a temperature ranging from 0° C. to 35° C. for 12 hours to 36 hours so as to form a second mixture, and
        acidifying the second mixture so as to form an acidified solution having a pH value ranging from 2 to 3, thus the hydroxylated nanodiamonds are transformed into thiolated nanodiamonds.

2. The thiolation method for modifying the nanodiamonds of claim 1, further comprising:
    providing a separation step, wherein the thiolated nanodiamonds are separated from the acidified solution;
    providing a washing step, wherein the thiolated nanodiamonds are washed with a water; and
    providing a drying step, wherein the thiolated nanodiamonds washed with the water are heated to dryness.

3. The thiolation method for modifying the nanodiamonds of claim 2, wherein the drying step is conducted at a temperature ranging from 40° C. to 80° C. for 16 hours to 32 hours.

4. The thiolation method for modifying the nanodiamonds of claim 1, wherein the hydroxylation step comprises:
    providing a reduction step, wherein the carboxylated nanodiamonds, the reductant and a first solvent are mixed, and the carboxyl groups of the carboxylated nanodiamonds are reduced so as to form a reaction solution; and
    providing a hydrolysis step, wherein a second acidic substance is added into the reaction solution so as to obtain the hydroxylated nanodiamonds.

5. The thiolation method for modifying the nanodiamonds of claim 4, wherein the first solvent is anhydrous tetrahydrofuran or anhydrous ether.

6. The thiolation method for modifying the nanodiamonds of claim 4, wherein the reduction step is conducted at a temperature ranging from 40° C. to 80° C. for 20 hours to 30 hours.

7. The thiolation method for modifying the nanodiamonds of claim 4, wherein the second acidic substance is hydrochloric acid, sulfuric acid, hydrobromic acid, hydroiodic acid or acetic acid.

8. The thiolation method for modifying the nanodiamonds of claim 1, wherein an average particle size of the nanodiamonds ranges from 5 nm to 100 nm.

9. The thiolation method for modifying the nanodiamonds of claim 1, wherein the oxidant is an acid, ozone, potassium permanganate, potassium dichromate or a mixture of sulfuric acid and hydrogen peroxide.

10. The thiolation method for modifying the nanodiamonds of claim 9, wherein the acid is sulfuric acid, nitric acid, perchloric acid, hydrochloric acid or a mixture thereof.

11. The thiolation method for modifying the nanodiamonds of claim 1, wherein the carboxylation step is conducted at a temperature ranging from 85 to 130° C. for 60 hours to 84 hours.

12. The thiolation method for modifying the nanodiamonds of claim 1, wherein the sulfur source in the thiolation step is thiourea or thioacetic acid.

13. The thiolation method for modifying the nanodiamonds of claim 1, wherein the first acidic substance in the thiolation step is hydrobromic acid, acetic acid, hydroiodic acid, chloric acid, perchloric acid, phosphoric acid or a mixture thereof.

14. The thiolation method for modifying the nanodiamonds of claim 1, wherein a pH value of the first acidic substance in the thiolation step ranges from 0 to 2.

15. The thiolation method for modifying the nanodiamonds of claim 1, wherein a pH value of the alkaline solution in the thiolation step ranges from 10 to 14.

16. The thiolation method for modifying the nanodiamonds of claim 1, wherein the alkaline solution in the thiolation step is a sodium hydroxide solution or a potassium hydroxide solution.

17. The thiolation method for modifying the nanodiamonds of claim 1, wherein a temperature of the alkaline solution in the thiolation step ranges from 0° C. to 30° C.

18. The thiolation method for modifying the nanodiamonds of claim 1, wherein a concentration of the alkaline solution in the thiolation step ranges from 5 weight percentage to 30 weight percentage.

19. The thiolation method for modifying the nanodiamonds of claim 1, wherein the second mixture is acidified by adding sulfuric acid, hydrochloric acid, hydrobromic acid, hydroiodic acid or acetic acid into the second mixture.

20. The thiolation method for modifying the nanodiamonds of claim 19, wherein a concentration of the sulfuric acid, the hydrochloric acid, the hydrobromic acid, the hydroiodic acid or the acetic acid ranges from 35 weight percentage to 75 weight percentage.

21. The thiolation method for modifying the nanodiamonds of claim 1, wherein the second mixture is acidified at a temperature ranging from 0° C. to 15° C.

* * * * *